United States Patent
Okamoto et al.

(10) Patent No.: US 10,246,033 B2
(45) Date of Patent: Apr. 2, 2019

(54) PROTECTOR AND WIRE HARNESS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ryouya Okamoto, Mie (JP); Hiroki Hirai, Mie (JP); Tetsuji Tanaka, Mie (JP); Hiroomi Hiramitsu, Mie (JP); Hiroshi Shimizu, Mie (JP); Hitoshi Takeda, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/747,338

(22) PCT Filed: Jul. 8, 2016

(86) PCT No.: PCT/JP2016/070230
§ 371 (c)(1),
(2) Date: Jan. 24, 2018

(87) PCT Pub. No.: WO2017/018165
PCT Pub. Date: Feb. 2, 2017

(65) Prior Publication Data
US 2018/0222404 A1    Aug. 9, 2018

(30) Foreign Application Priority Data

Jul. 28, 2015 (JP) .................. 2015-148327

(51) Int. Cl.
| B60R 16/02 | (2006.01) |
| --- | --- |
| H02G 3/04 | (2006.01) |
| H02G 3/06 | (2006.01) |

(52) U.S. Cl.
CPC .......... *B60R 16/0215* (2013.01); *H02G 3/04* (2013.01); *H02G 3/0487* (2013.01); *H02G 3/0608* (2013.01)

(58) Field of Classification Search
CPC .. B60R 16/0215; B60R 16/0222; H02G 3/04; H02G 11/00; H02G 3/0406; H02G 3/0475
(Continued)

(56) References Cited

U.S. PATENT DOCUMENTS

| 5,688,144 A | 11/1997 | Kosuge |
| --- | --- | --- |
| 6,015,952 A * | 1/2000 | Mori .................. B60R 16/0222 16/2.1 |

(Continued)

FOREIGN PATENT DOCUMENTS

| JP | 2004-120948 A | 4/2004 |
| --- | --- | --- |
| JP | 2006-014584 A | 1/2006 |

OTHER PUBLICATIONS

Search Report for PCT/JP2016/070230, dated Aug. 2, 2016.

*Primary Examiner* — Steven T Sawyer
(74) *Attorney, Agent, or Firm* — Honigman LLP

(57) ABSTRACT

A protector includes: a first unit into which an electrical wire is to be inserted; and a second unit into which a portion of the electrical wire is to be inserted, the portion being other than a portion that is not to be inserted into the first unit. The first unit includes a coupling-target portion, and the second unit includes a coupling portion that is coupled to the coupling-target portion so as to be rotatable relative to the coupling-target portion.

9 Claims, 13 Drawing Sheets

(58) Field of Classification Search
 USPC .......................................................... 174/72 A
 See application file for complete search history.

(56) References Cited

U.S. PATENT DOCUMENTS

| | | | |
|---|---|---|---|
| 6,350,956 B1* | 2/2002 | Sakata | B60R 16/0215 16/221 |
| 2002/0068486 A1* | 6/2002 | Kafer | B60R 16/0215 439/625 |
| 2011/0056136 A1* | 3/2011 | Rodgers | E06B 7/28 49/70 |

* cited by examiner

PROTECTOR AND WIRE HARNESS

CROSS-REFERENCE TO RELATED APPLICATIONS

This application is the U.S. national stage of PCT/JP2016/070230 filed Jul. 8, 2016, which claims priority of Japanese Patent Application No. JP 2015-148327 filed Jul. 28, 2015.

TECHNICAL FIELD

The present description discloses technology regarding a protector.

BACKGROUND

Conventional technology for covering and protecting electrical wires using a protector is known. A protector disclosed in JP 2014-204582A is provided with a protector body that includes an expandable/contractible housing portion that has a bellows-like shape and is expandable and contractible, and a covering member that covers the protector body. The covering member with a curved shape that matches the shape of the protector body is attached to the protector body, the expandable/contractible housing portion of which is curved along a routing path of a wire harness.

One may wish to change the shape of a protector in order to improve workability, etc. For example, one may wish to change the shape of a protector in order to fit a connector, which is connected to a wire harness covered by the protector, to another connector, or to move the wire harness aside when fastening a screw that is located below the wire harness covered by the protector. In JP 2014-204582A, although the protector body is allowed to expand and contract, the covering member is not expandable or contractible. Therefore, there is a problem in which it is impossible to change the shape of the protector without replacing the covering member with a covering member that has a different shape.

The present invention has been made in view of the above-described situation, and aims to provide a protector of which the shape can be changed.

SUMMARY

A protector according to the present invention includes: a first unit into which an electrical wire is to be inserted; and a second unit into which a portion of the electrical wire is to be inserted, the portion being a portion that is not to be inserted into the first unit. The first unit includes a coupling-target portion, and the second unit includes a coupling portion that is coupled to the coupling-target portion so as to be rotatable relative to the coupling-target portion.

With this configuration, the coupling portion of the second unit is coupled to the coupling-target portion of the first unit so as to be rotatable relative to the coupling-target portion. Therefore, the first unit and the second unit are rotatable relative to each other. Thus, it is possible to change the shape of the protector.

The present invention is preferably carried out in the following modes.

A restriction portion that restricts the coupling portion from being rotated by more than a predetermined amount relative to the coupling-target portion is provided.

With this configuration, the restriction portion restricts the coupling portion from being rotated by more than the predetermined amount. Therefore, it is easy to change the shape of the protector to a predetermined shape.

The coupling-target portion includes a first tubular portion that is tubular, and an engagement-target portion that is provided in an inner surface of the first tubular portion, and the coupling portion includes a second tubular portion that is tubular and is fitted into the first tubular portion, and an engagement portion that is provided on an outer surface of the second tubular portion and engages with the engagement-target portion to restrict the coupling portion from moving in a coupling direction relative to the coupling-target portion.

Thus, with such a simple configuration, the first unit and the second unit can be coupled to each other and can be rotated relative to each other.

The first tubular portion includes an extension portion so that a length of a protrusion of the first tubular portion in an axial direction thereof is greater than a length of a protrusion of the second tubular portion in an axial direction thereof.

With this configuration, the extension portion prevents the electrical wire from getting caught.

The first unit includes a first main portion that is continuous with the coupling-target portion and into which the electrical wire is to be inserted, the second unit includes a second main portion that is continuous with the coupling portion and into which the electrical wire is to be inserted, and upon the coupling portion being rotated relative to the coupling-target portion, the first main portion and the second main portion extend to the same side in substantially parallel to each other.

With such a configuration, the protector can be made more compact, and costs such as transportation costs can be reduced.

The present invention may be carried out as a wire harness that includes the wire and the protector.

Advantageous Effects of Invention

The present invention makes it possible to change the shape of the protector.

DETAILED DESCRIPTION OF PREFERRED EMBODIMENTS

First Embodiment

The following describes a first embodiment with reference to FIGS. 1 to 10.

A wire harness 20 according to the present embodiment can be used to route electrical wires in a vehicle such as an electric vehicle or a hybrid vehicle. In the present embodiment, the wire harness 20 is provided in an electricity storage module 10, which serves as a driving source of a vehicle. In the following description, "X direction" is a forward direction, "Y direction" is a leftward direction, and "Z direction" is an upward direction.

Electricity Storage Module 10

Figure 1:
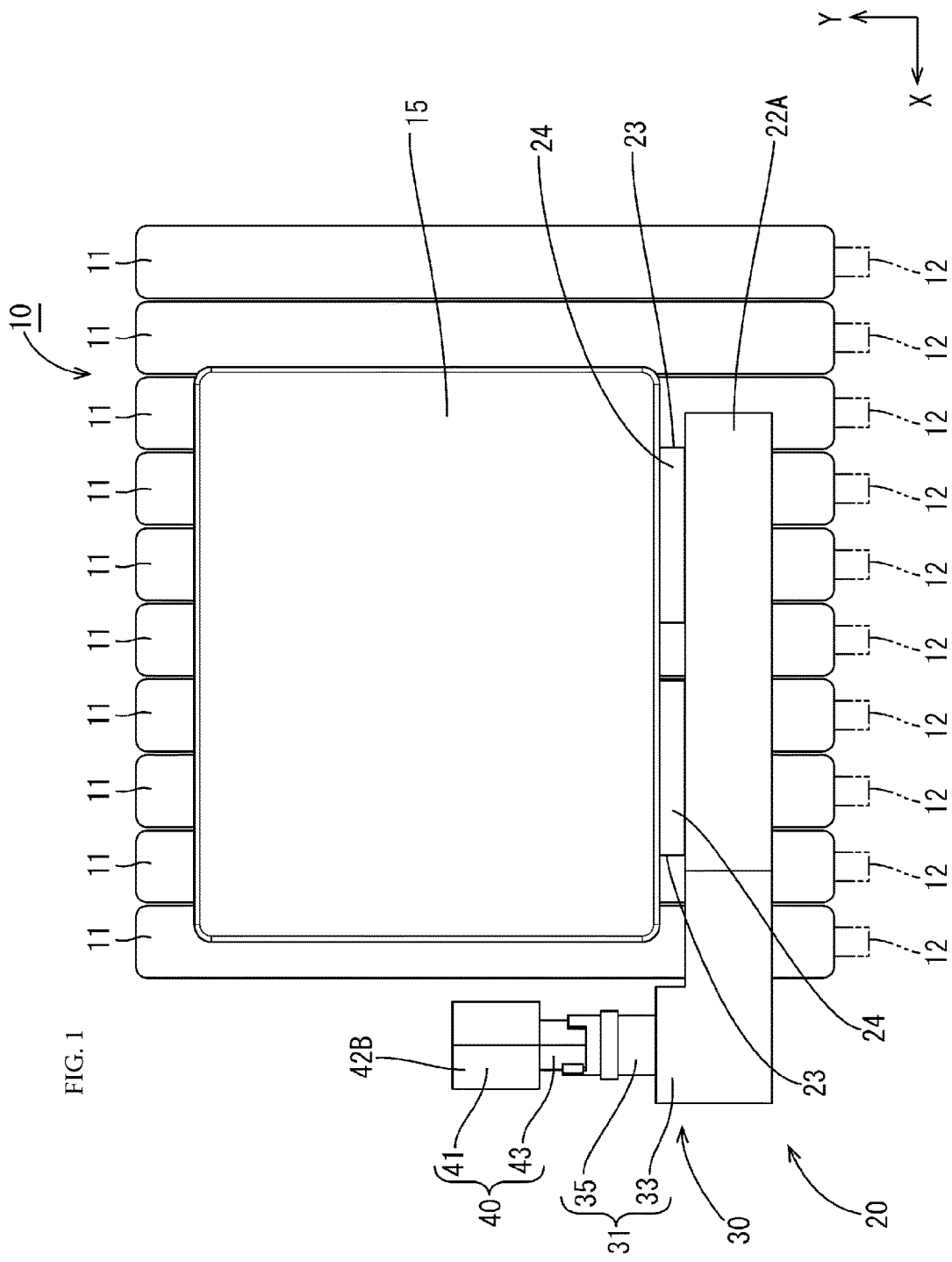
FIG. 1 is a plan view of an electricity storage module according to a first embodiment.

As shown in FIG. 1, the electricity storage module 10 is provided with a plurality of electricity storage devices 11 (ten devices in the present embodiment), and an ECU (Electronic Control Unit) 15. The plurality of electricity storage devices 11 each have a substantially parallelepiped flat shape, and each house electricity storage elements (not shown). A pair of positive and negative electrode terminals 12 (see FIG. 1) is provided on one side surface of each electricity storage device 11. Here, a pair of electrode terminals 12 are provided on one side surface of each electricity storage device 11. However, the present invention is not limited to such a configuration, and, for example, electrode terminals 12 that have different polarities may be respectively provided on left and right side surfaces of each electricity storage device 11. The electricity storage devices 11 are arranged such that the polarities of electrode terminals 12 that are adjacent to each other are opposite. Electrode terminals 12 that are adjacent to each other are electrically connected to each other using a connecting member that is made of metal (not shown), and thus the plurality of electricity storage devices 11 are connected in series. The electricity storage devices 11 may be secondary batteries such as nickel hydride secondary batteries, lithium ion secondary batteries, or lead storage batteries, or capacitors such as electric double-layer capacitors or lithium ion capacitors, for example.

Figure 2:
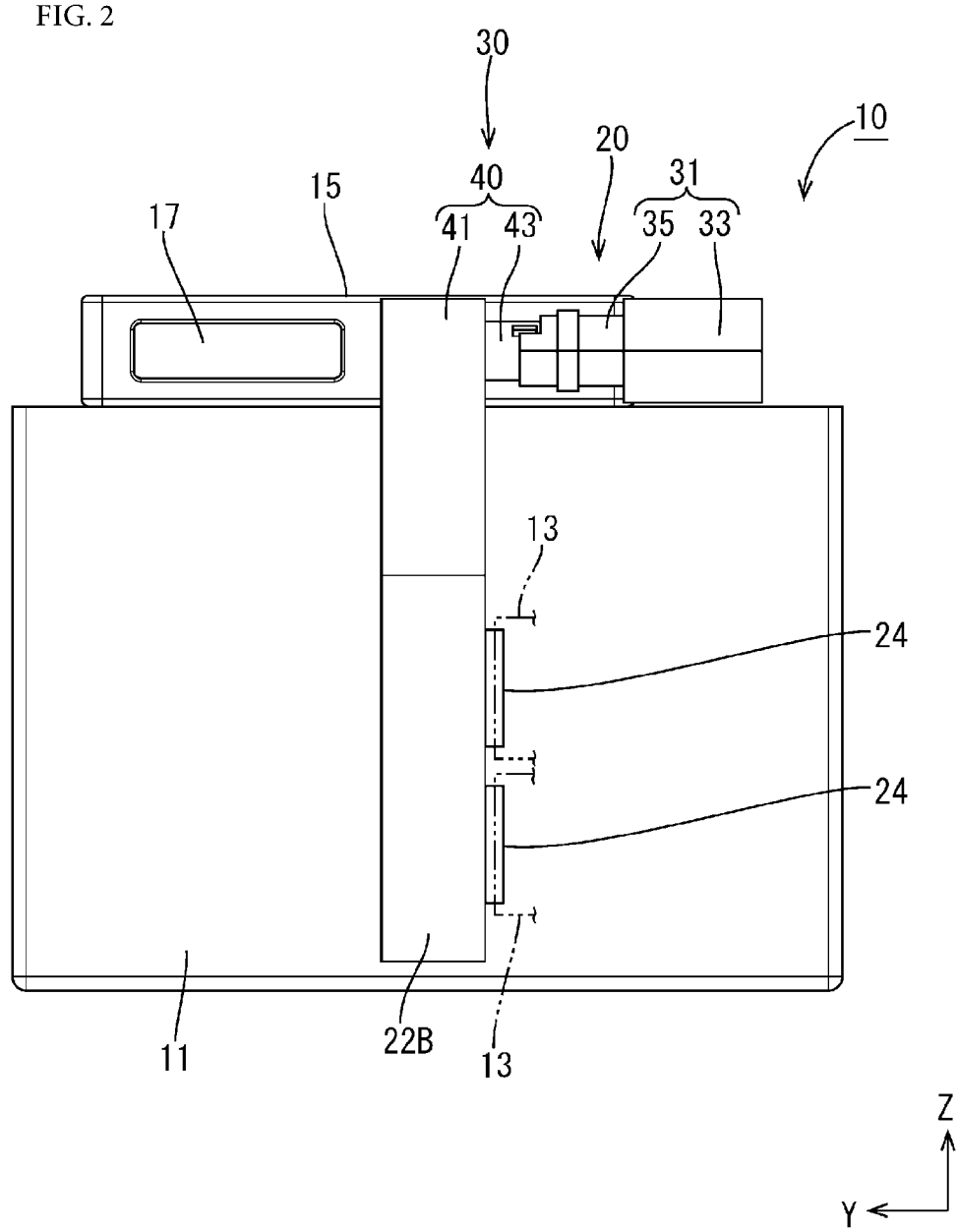
FIG. 2 is a front view of the electricity storage module.
Figure 3:
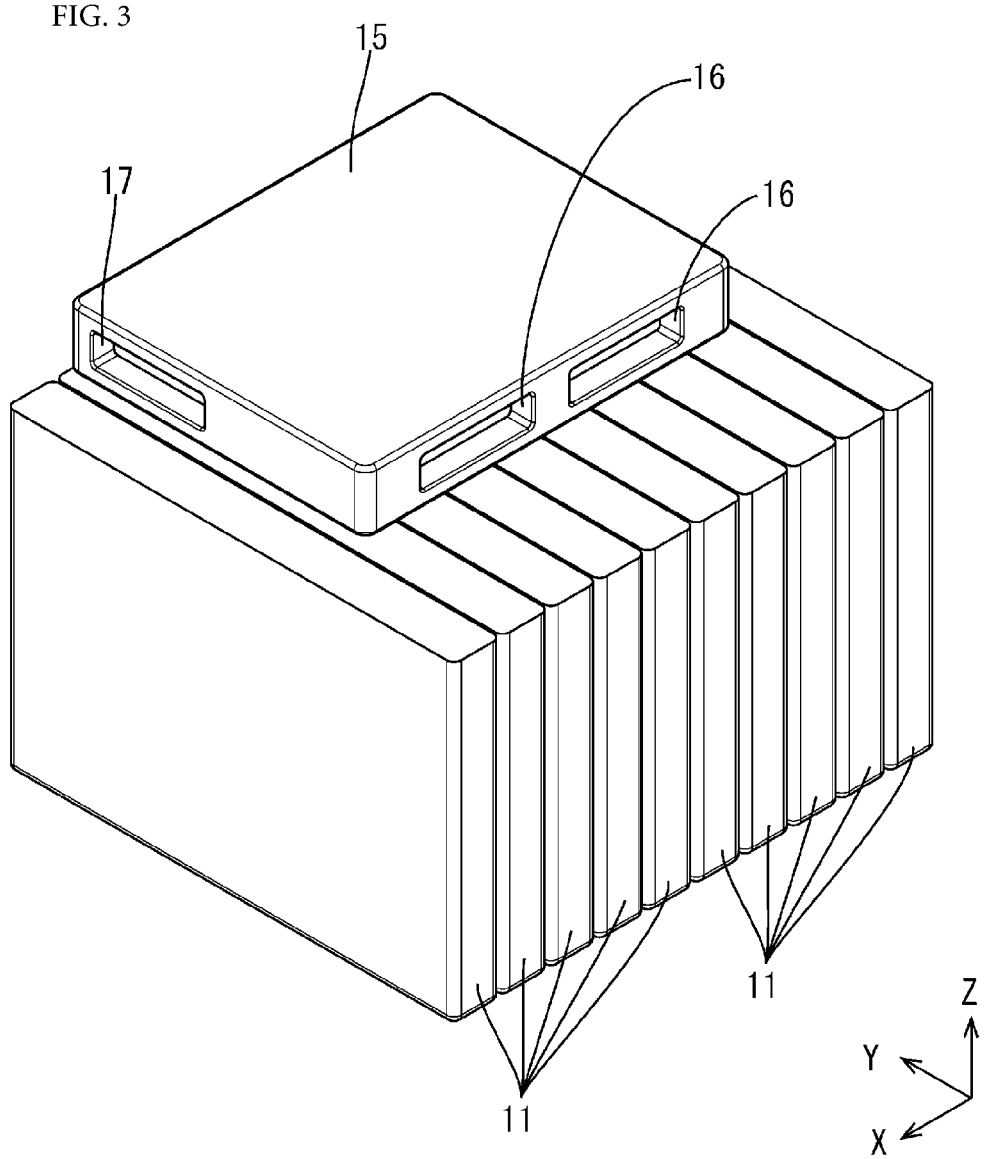
FIG. 3 is a perspective view of the electricity storage module in a state where a wire harness has been removed.

Voltage detection terminals that are connected to terminal portions of voltage detection electrical wires (not shown) are electrically connected to the electrode terminals 12, and the opposite terminal portions of the plurality of voltage detection electrical wires are bound together and are connected to detection connectors 13 (see FIG. 2). As shown in FIG. 3, the ECU 15 is a flat parallelepiped apparatus that is equipped with a microcomputer, devices, etc, and has a well-known configuration that is provided with the function of detecting voltages, currents, temperatures, etc. of the electricity storage devices 11, the function of performing control to charge and discharge each of the electricity storage devices 11, for example. The ECU 15 is provided with a plurality of apparatus-side connectors 16 and 17. The apparatus-side connectors 16 and 17 include connector housings that are made of an insulative synthetic resin, and the connector housings hold a plurality of connector terminals (not shown). The apparatus-side connectors 16 and the detection connectors 13 are connected to each other using the wire harness 20.

Wire Harness 20

Figure 4:
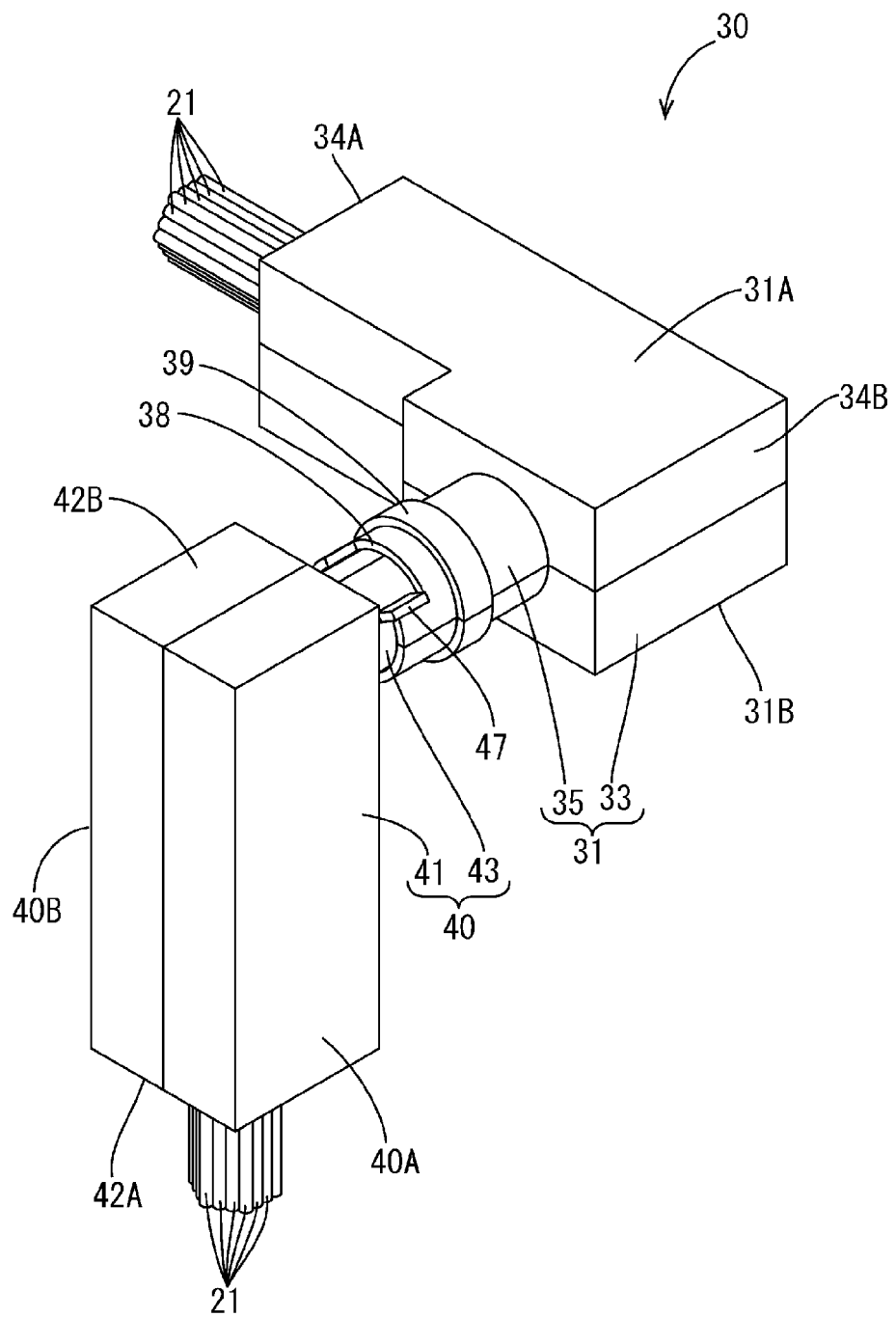
FIG. 4 is a perspective view of a protector into which electrical wires are inserted.
Figure 5:
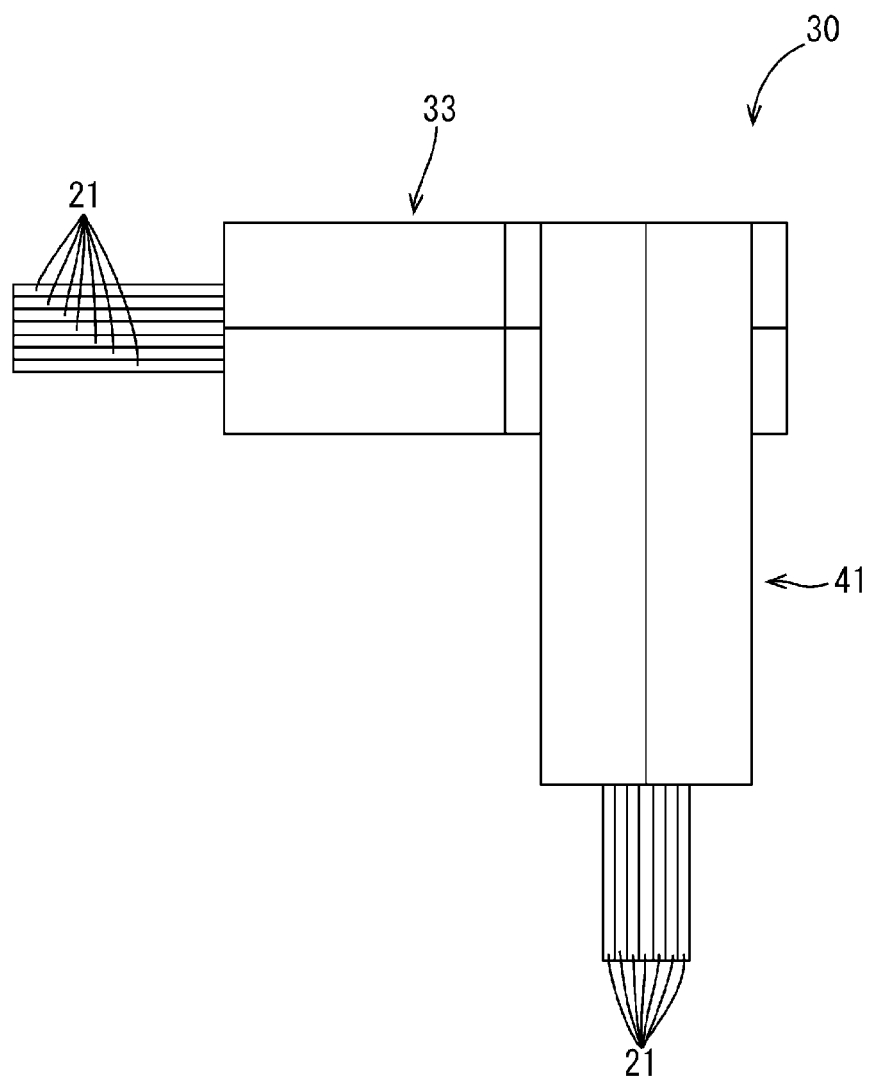
FIG. 5 is a front view of the protector into which electrical wires are inserted.

As shown in FIG. 4, the wire harness 20 includes a plurality of electrical wires 21, a protector 30 that protects the electrical wires 21, and connecting protectors 22A and 22B (see FIGS. 1 and 2) that protect the electrical wires 21. Each electrical wire 21 is a coated electrical wire that includes a core and an insulative coating (an insulative layer) that wraps around the core. The core is made of copper, a copper alloy, aluminum, an aluminum alloy, or the like. The core is, for example, a stranded wire formed by twisting a plurality of metal strands together, a single core, or the like. All of the plurality of electrical wires 21 are wound with a tape inside the protector 30 and the connecting protectors 22A and 22B. This taping is performed using a rough winding method, by which the tape is spirally wound around the plurality of electrical wires 21 such that portions of the wires are exposed from the tape.

The connecting protectors 22A and 22B are made of an insulative synthetic resin, and are provided with a plurality of connector housings 23 that are arranged in directions in which the connecting protectors 22A and 22B extend. Each connector housing 23 holds a plurality of connector terminals (not shown) to form a connector 24. The connector terminals are connected to terminal portions of the electrical wires 21. The connectors 24 are fitted to the apparatus-side connectors 16 and the detection connectors 13, and thus the voltage detection terminals and the circuitry of the ECU 15 are electrically connected to each other. The connecting protectors 22A and 22B are dividable along a surface that extends in a radial direction, and allow the electrical wires 21 to be inserted thereinto in a split-in-half state where the connecting protectors 22A and 22B are divided.

Protector 30

Figure 6:
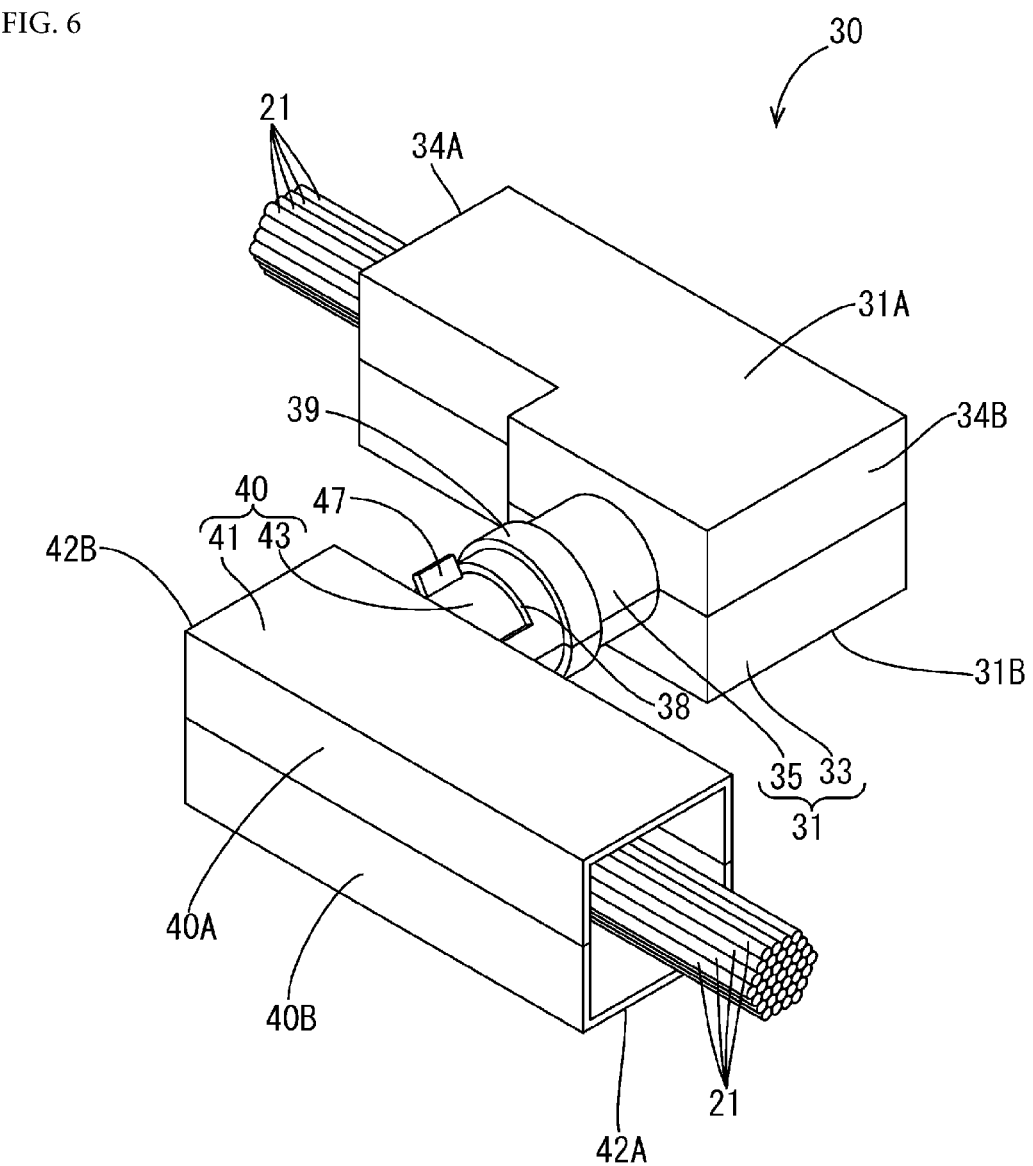
FIG. 6 is a perspective view of a second unit rotated from the state depicted in FIG. 4 by −90 degrees relative to a first unit.
Figure 7:
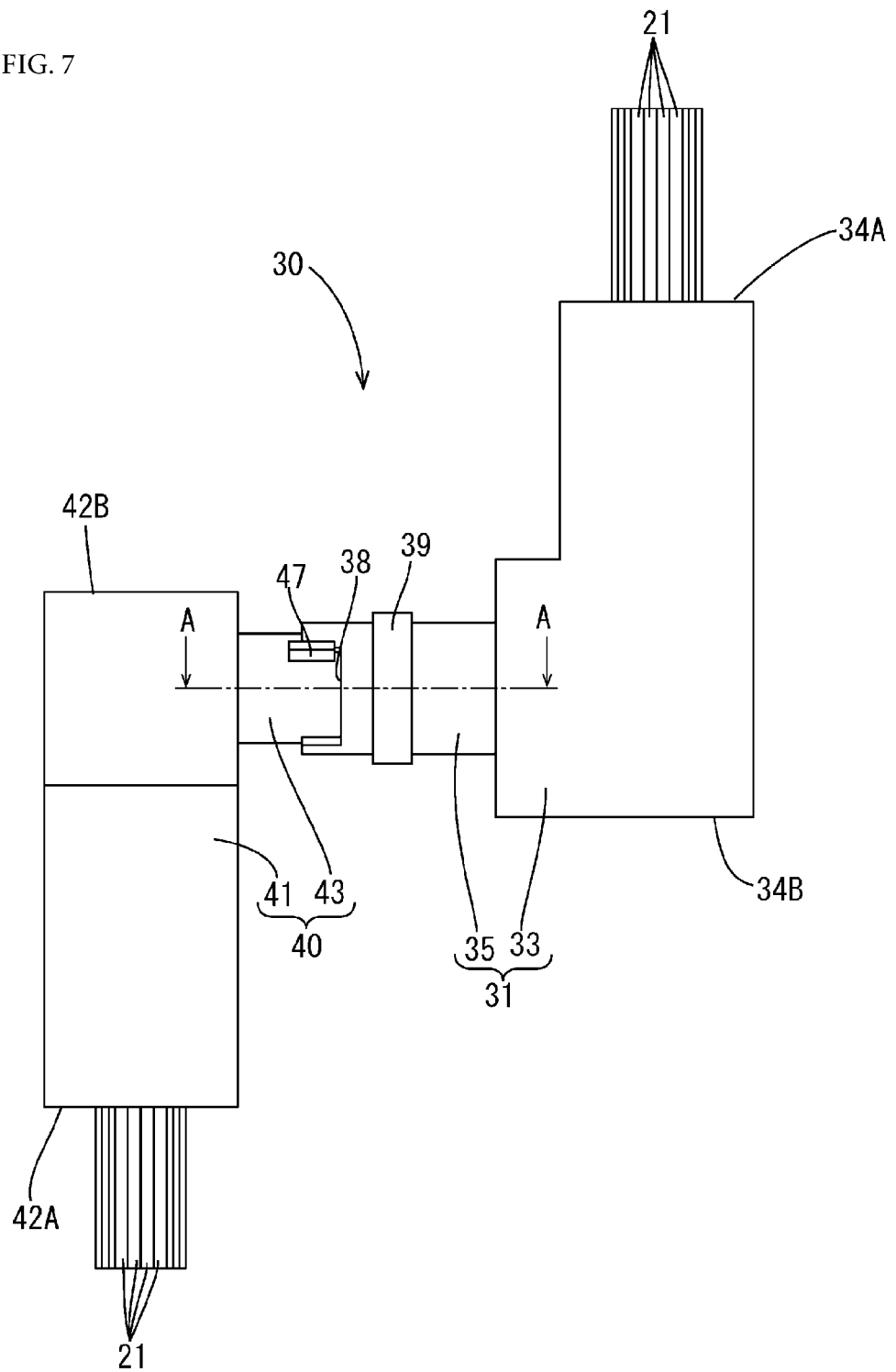
FIG. 7 is a plan view showing the state depicted in FIG. 6.

The protector 30 is made of an insulative synthetic resin, and, as shown in FIGS. 4 and 6, includes a first unit 31 and a second unit 40, into which different portions of the electrical wires 21 are inserted. An electrical wire insertion hole 32 (see FIG. 8) into which the electrical wires 21 are inserted is formed in the protector 30 so as to penetrate therethrough. Portions of the electrical wires 21 having a predetermined length are inserted into the first unit 31. The first unit 31 includes a first main portion 33 and a coupling-target portion 35 that extends in a direction that is orthogonal to a direction in which the first main portion 33 extends.

The first main portion 33 has a square tube shape into which the electrical wires 21 can be inserted. One end portion 34A of the first main portion 33 in the lengthwise direction is open, and the other end portion 34B is closed. The coupling-target portion 35 protrudes (extends) in a direction that is orthogonal to a direction in which the first main portion 33 extends (the lengthwise direction of the first main portion 33), from one side surface of the first main portion 33 on an end portion side.

Figure 8:
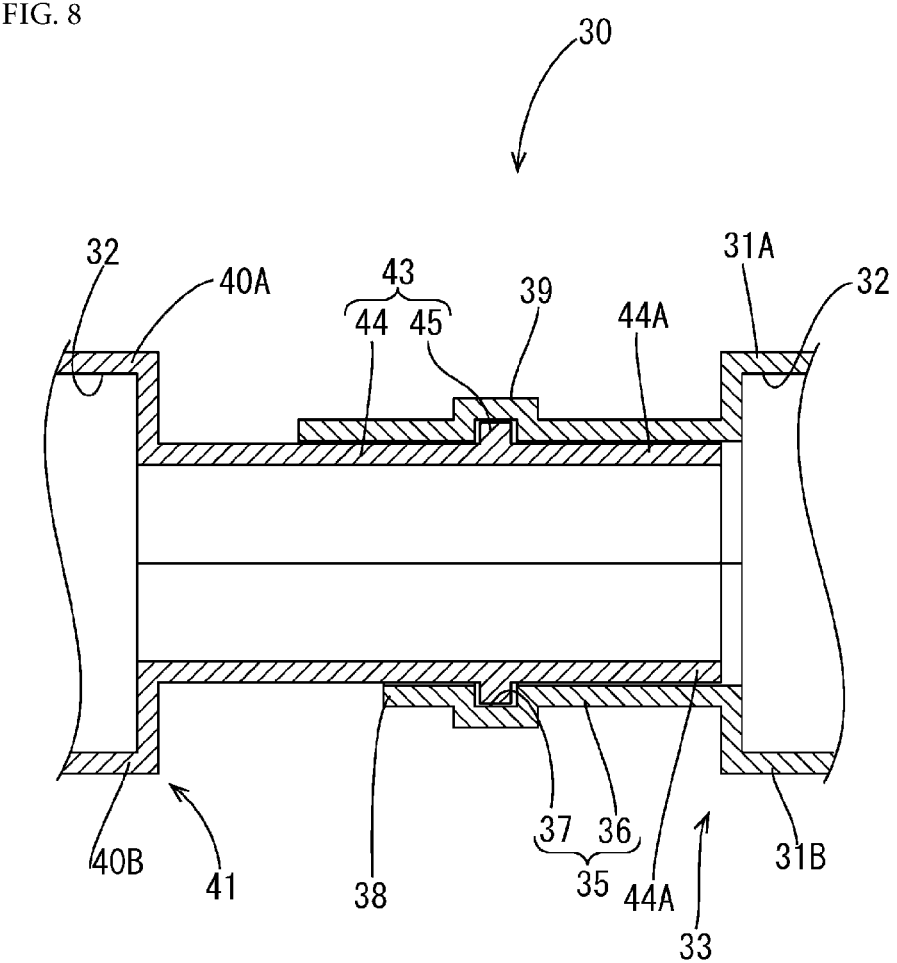
FIG. 8 is a cross-sectional view along a line A-A in FIG. 7, from which electrical wires are omitted.
Figure 9:
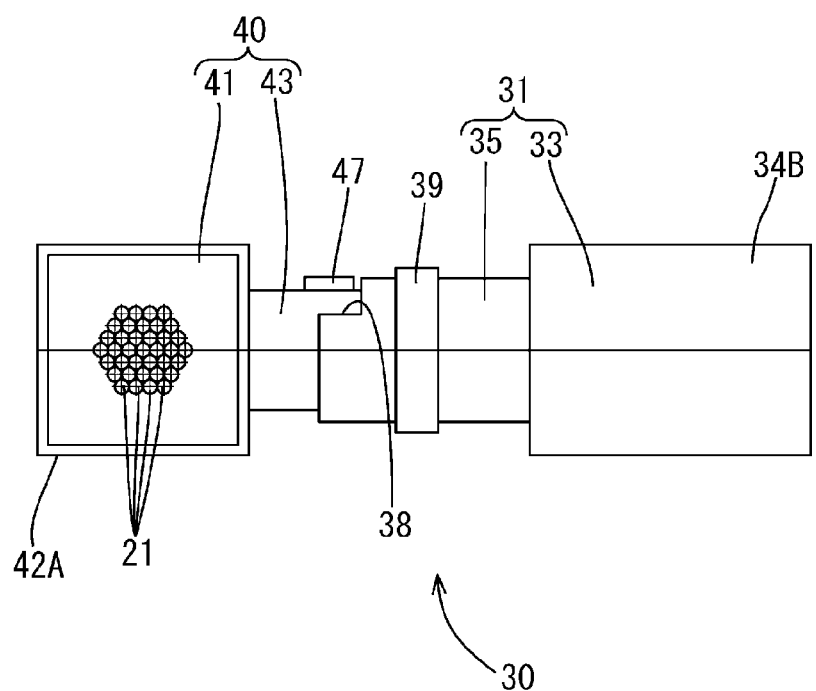
FIG. 9 is a front view showing the state depicted in FIG. 6.
Figure 10:
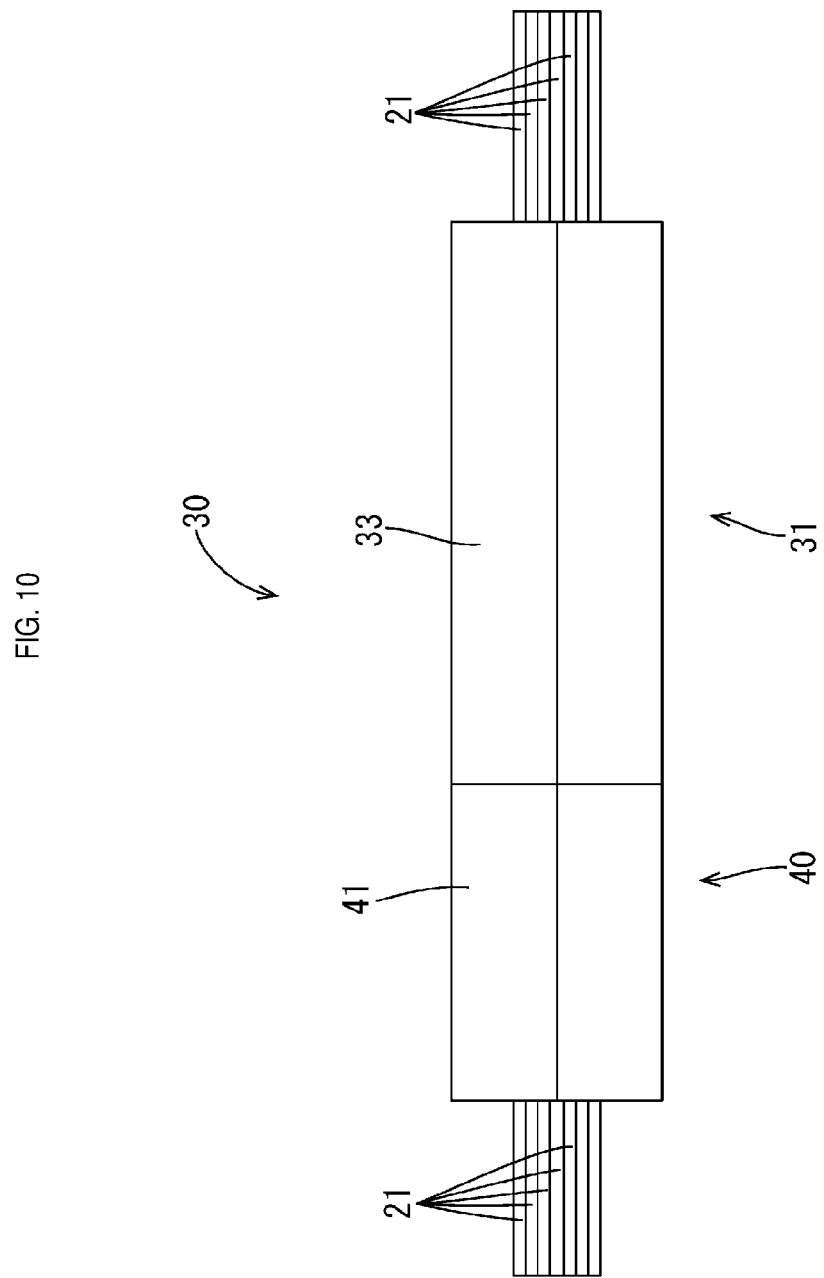
FIG. 10 is a side view showing the state depicted in FIG. 6.

As shown in FIG. 8, the coupling-target portion 35 includes a first tubular portion 36, which is tubular, and an engagement-target portion 37. The first tubular portion 36 has a cylindrical shape, and the engagement-target portion 37, which includes a groove that has a constant depth, is formed in the inner circumferential surface of the first tubular portion 36 at a predetermined position relative to a base end thereof, along the entire circumference thereof. An outer side portion of the engagement-target portion 37 is a ring-shaped protrusion 39. A cutout portion 38 is formed in a leading end portion of the coupling-target portion 35. The cutout portion 38 has a length in a circumferential direction (an angle) that corresponds to the rotational angle of a coupling portion 43 relative to the coupling-target portion 35. In the present embodiment, the cutout portion 38 is formed by cutting out a belt-shaped portion of the first tubular portion 36 to allow the coupling portion 43 to rotate by −90 degrees relative to the coupling-target portion 35.

The second unit 40 is a unit into which portions of the electrical wires 21 that are not inserted into the first unit 31 are inserted, and includes a second main portion 41, and the coupling portion 43 that extends in a direction that is orthogonal to a direction in which the second main portion 41 extends. The second main portion 41 has a square tube shape into which the electrical wires 22 can be inserted. One end portion 42A of the second main portion 41 in the lengthwise direction is open, and the other end portion 42B is closed.

The coupling portion 43 protrudes (extends) in a direction that is orthogonal to a direction in which the first main portion 33 extends (the lengthwise direction of the first main portion 33), from one side surface of the second main portion 41 on an end portion side. As shown in FIG. 8, the coupling portion 43 includes a second tubular portion 44 that is tubular, and an engagement portion 45. The engagement portion 45, which protrudes outward by a constant length and engages with the engagement-target portion 37, is formed on an outer circumferential surface of the second tubular portion 44 at a predetermined position relative to a base end thereof, along the entire circumference thereof (so as to have a ring-like shape).

A portion of the second tubular portion 44 on the leading end side relative to the engagement portion 45 is an extension portion 44A that extends farther in a coupling direction compared to a portion of the first tubular portion 36 on the leading end side relative to the engagement-target portion 37. The leading end of the extension portion 44A is located at the position of the base end portion of the coupling-target portion 35. As shown in FIG. 6, a restriction portion 47 that has a plate-like shape protrudes outward from the outer circumferential surface of the second tubular portion 44. The plate surface of the restriction portion 47 extends in a radial direction of the coupling portion 43, and moves in the circumferential direction within the range of the cutout of the cutout portion 38 of the coupling-target portion 35.

The first unit 31 and the second unit 40 are not easily deformable (not easily bendable), and are made of a material that is hard and thick enough to protect the electrical wires 21. The first unit 31 is formed by fitting a pair of divisional members 31A and 31B, which are divided from each other along a direction in which the electrical wires 21 extend, to each other. The second unit 40 is formed by fitting a pair of divisional members 40A and 40B to each other. The divisional members 31A and 31B (40A and 40B) are divided from each other so that the electrical wires 21 can be inserted thereinto. In order to hold a pair of divisional members in the state of being fitted to each other, a locking piece (not shown) may be provided on one of the divisional members so as to be locked to the other, or the divisional members may be fixed to each other using an adhesive or by winding a piece of tape therearound.

Next, a method for manufacturing the wire harness 20 will be described.

For example, the first unit 31 and the second unit 40 are transported in a parallel orientation (the state depicted in FIG. 6). At the time of assembly, an operator grips the first unit 31 and the second unit 40, and rotates the second unit 40 by 90 degrees relative to the first unit 31. As a result, the coupling portion 43 is rotated by 90 degrees relative to the coupling-target portion 35, and the first unit 31 and the second unit 40 are orientated such that the direction in which the second unit 40 extends is orthogonal to the direction in which the first unit 31 extends. Then, the connecting protectors 22A and 22B are attached to the protector 30 so as to be continuous therewith, to form the wire harness 20, and connectors 24 on the first unit 31 side are fitted to the apparatus-side connectors 16 of the ECU 15, and connectors 24 on the second unit 40 side are fitted to the detection connectors 13. Thus, the wire harness 20 is brought into the state of being attached to the electricity storage module 10.

When the wire harness 20 is removed from the electricity storage module 10, the detection connectors 13 and the apparatus-side connectors 16 are detached from the wire harness 20. Then, for example, the second unit 40 may be rotated by −90 degrees relative to the first unit 31 so that the first unit 31 and the second unit 40 are orientated to be parallel to each other.

The present embodiment achieves the following actions and effects.

In the present embodiment, the coupling portion 43 of the second unit 40 is coupled to the coupling-target portion 35 of the first unit 31 so as to be rotatable relative to the coupling-target portion 35. Therefore, the first unit 31 and the second unit 40 are rotatable relative to each other. Therefore, it is possible to change the shape of the protector 30.

Also, the restriction portion 47 that restricts the coupling portion 43 from being rotated by more than a predetermined amount relative to the coupling-target portion 35 is provided.

With this configuration, the restriction portion 47 restricts the coupling portion 43 from being rotated by more than the predetermined amount. Therefore, it is easy to change the shape of the protector 30 to a predetermined shape.

The coupling-target portion 35 includes the first tubular portion 36, which is tubular, and the engagement-target portion 37, which is provided in the inner surface of the first tubular portion 36. The coupling portion 43 includes the second tubular portion 44, which is tubular and is fitted into the first tubular portion 36, and the engagement portion 45, which is provided on the second tubular portion 44, and engages with the engagement-target portion 37 to restrict the coupling portion 43 from moving in a coupling direction relative to the coupling-target portion 35.

Thus, with such a simple configuration, the first unit 31 and the second unit 40 can be coupled to each other and can be rotated relative to each other.

In addition, the first tubular portion 44 includes the extension portion 44A such that the size of the protrusion of the first tubular portion 44 in the axial direction thereof is greater than the size of the protrusion of the second tubular portion 36 in the axial direction thereof.

With this configuration, the extension portion 44A prevents the electrical wires 21 from getting caught.

Second Embodiment

Figure 11:
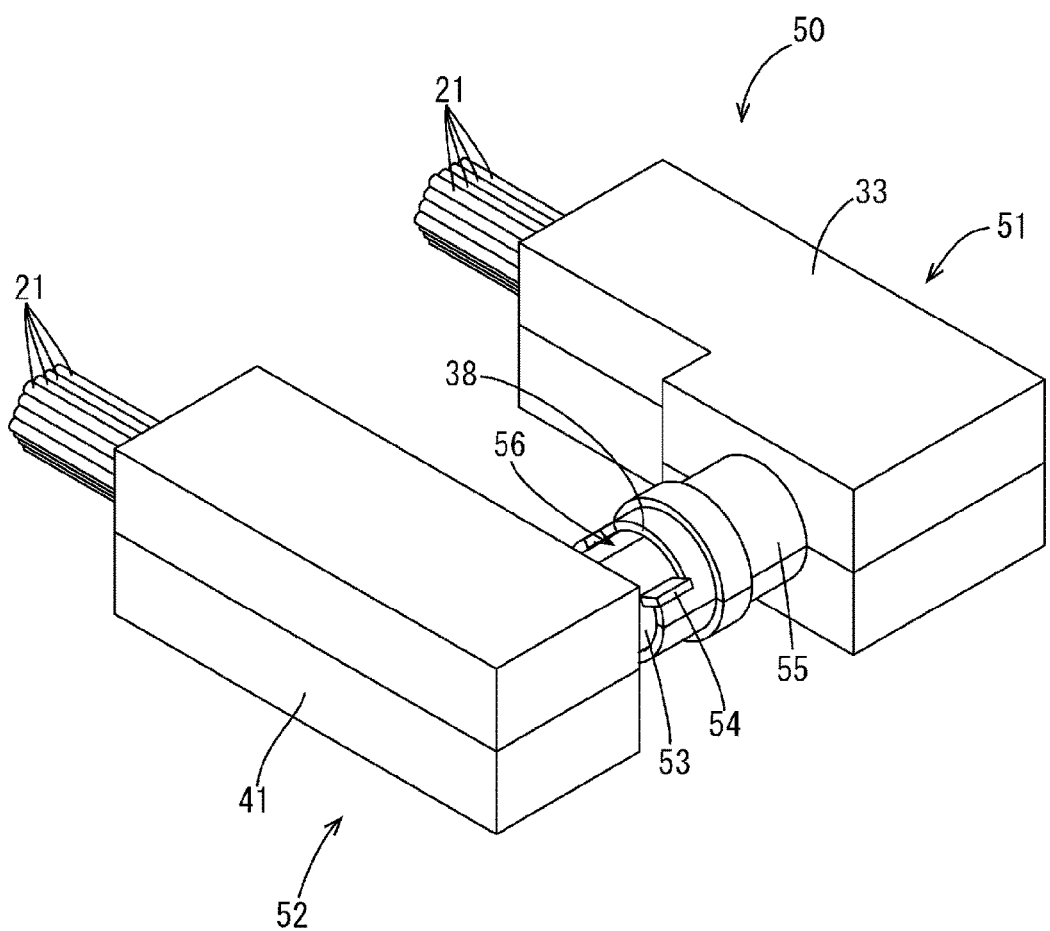
FIG. 11 is a perspective view of a protector according to a second embodiment, into which electrical wires are inserted.
Figure 12:
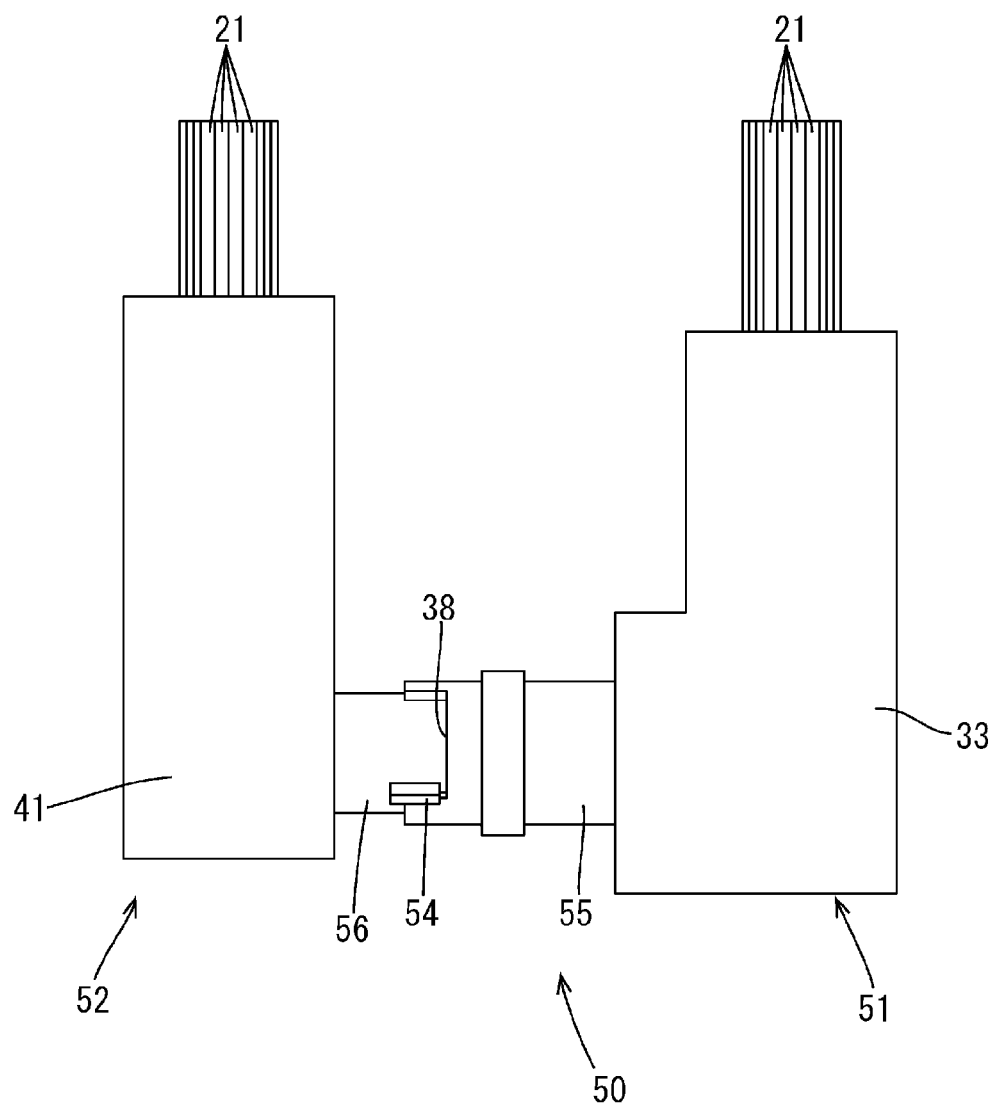
FIG. 12 is a plan view of the protector into which electrical wires are inserted.
Figure 13:
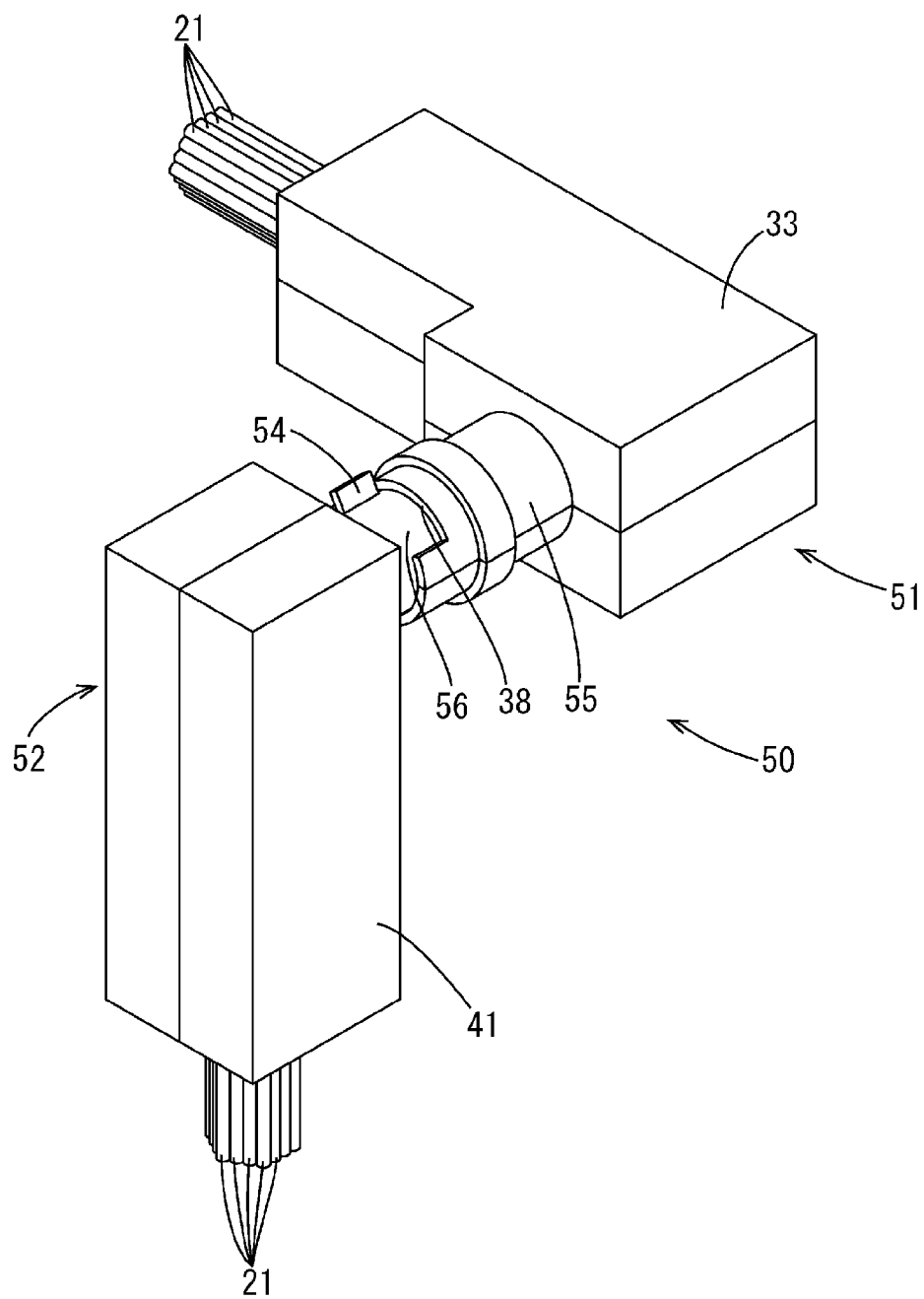
FIG. 13 is a perspective view of a second unit rotated from the state depicted in FIG. 11 by −90 degrees relative to a first unit.

The following describes a second embodiment with reference to FIGS. 11 to 13. In the first embodiment, in the state where the first unit 31 and the second unit 40 are arranged parallel to each other, the first unit 31 and the second unit 40 extend in opposite directions. In the second embodiment, in the state where a first unit 51 and a second unit 52 of a protector 50 are arranged parallel to each other, the first unit 51 and the second unit 52 extend in the same direction side by side. In the following description, the same components as in the first embodiment are assigned the same reference numerals.

A restriction portion 54 that has a plate-like shape protrudes outward from the outer circumferential surface of a second tubular portion 53. The restriction portion 54 moves in a circumferential direction within the range of the cutout of the cutout portion 38. The first unit 51 includes the first main portion 33 that is continuous with a coupling-target portion 55 and into which the electrical wires 21 are inserted. The second unit 52 includes the second main portion 41 that is continuous with a coupling portion 56 and into which the electrical wires 21 are inserted. Upon the coupling portion 56 being rotated relative to the coupling-target portion 55, the first main portion 33 and the second main portion 41 extend to the same side in substantially parallel to each other.

In the second embodiment, the first main portion 33 and the second main portion 41 extend to the same side in substantially parallel to each other. Therefore, the protector 50 can be made more compact, and costs such as transportation costs can be reduced.

Other Embodiment

The present invention is not limited to the embodiments illustrated using the descriptions above and the drawings, and, for example, the following embodiments are also included in the technical scope of the present invention.

(1) Although the wire harness 20 connects the voltage detection terminals and the ECU 15 to each other, the present invention is not limited to such a configuration. The wire harness 20 may be a wire harness that is to be connected to an apparatus in a vehicle other than the ECU 15, or a wire harness that is to be routed in an apparatus other than a vehicle.

(2) The number of electrical wires 21 may be different from the number in the embodiments above. For example, there may be only one electrical wire 21.

(3) Although the wire harness 20 includes the connecting protectors 22A and 22B, it is possible that the wire harness 20 does not include the connecting protectors 22A and 22B. For example, terminals of the terminal portions of the electrical wires 21 may be connected to external terminals by being fastened with bolts or the like, without using connectors.

(4) The coupling-target portion 35 and the coupling portion 43 may replace each other. For example, a coupling-target portion may be formed inside a coupling portion.

The invention claimed is:

1. A wire harness comprising a protector, the protector comprising:
a first unit into which an electrical wire is to be inserted; and
a second unit into which a portion of the electrical wire is to be inserted, the portion being a portion that is not to be inserted into the first unit,
wherein the first unit includes a coupling-target portion that is tubular, the second unit includes a coupling portion that is also tubular, the coupling-target portion being concentric to the coupling portion so as to be rotatable relative to the coupling portion, the coupling portion forming a passage for which the electric wire is routed and the first unit and the second unit are configured to be orientated such that a direction in which the second unit extends is orthogonal to a direction in which the first unit extends, upon the coupling portion being rotated relative to the coupling-target portion; wherein the wire harness further includes a connector housing that forms a connector that allows another connector to be fitted thereto from a lateral side relative to the direction in which the first unit extends and the direction in which the second unit extends.

2. The protector according to claim 1, further comprising a restriction portion that restricts the coupling portion from being rotated by more than a predetermined amount relative to the coupling-target portion.

3. The protector according to claim 1,
wherein the coupling-target portion includes a first tubular portion that is tubular, and an engagement-target portion that is provided in an inner surface of the first tubular portion, and the coupling portion includes a second tubular portion that is tubular and is fitted into the first tubular portion, and an engagement portion that is provided on an outer surface of the second tubular portion and engages with the engagement-target portion to restrict the coupling portion from moving in a coupling direction relative to the coupling-target portion.

4. The protector according to claim 3,
wherein the first tubular portion includes an extension portion so that a length of a protrusion of the first tubular portion in an axial direction thereof is greater than a length of a protrusion of the second tubular portion in an axial direction thereof.

5. The protector according to claim 1,
wherein the first unit includes a first main portion that is continuous with the coupling-target portion and into which the electrical wire is to be inserted,
the second unit includes a second main portion that is continuous with the coupling portion and into which the electrical wire is to be inserted, and
upon the coupling portion being rotated relative to the coupling-target portion, the first main portion and the second main portion extend to the same side in substantially parallel to each other.

6. The protector according to claim 2, wherein the coupling-target portion includes a first tubular portion that is tubular, and an engagement-target portion that is provided in an inner surface of the first tubular portion, and the coupling portion includes a second tubular portion that is tubular and is fitted into the first tubular portion, and an engagement portion that is provided on an outer surface of the second tubular portion and engages with the engagement-target portion to restrict the coupling portion from moving in a coupling direction relative to the coupling-target portion.

7. The protector according to claim 2, wherein the first unit includes a first main portion that is continuous with the coupling-target portion and into which the electrical wire is to be inserted, the second unit includes a second main portion that is continuous with the coupling portion and into which the electrical wire is to be inserted, and upon the coupling portion being rotated relative to the coupling-target portion, the first main portion and the second main portion extend to the same side in substantially parallel to each other.

8. The protector according to claim 3, wherein the first unit includes a first main portion that is continuous with the coupling-target portion and into which the electrical wire is to be inserted, the second unit includes a second main portion that is continuous with the coupling portion and into which the electrical wire is to be inserted, and upon the coupling portion being rotated relative to the coupling-target portion, the first main portion and the second main portion extend to the same side in substantially parallel to each other.

9. The protector according to claim 4, wherein the first unit includes a first main portion that is continuous with the coupling-target portion and into which the electrical wire is to be inserted, the second unit includes a second main portion that is continuous with the coupling portion and into which the electrical wire is to be inserted, and upon the coupling portion being rotated relative to the coupling-target portion, the first main portion and the second main portion extend to the same side in substantially parallel to each other.

\* \* \* \* \*